United States Patent

[11] 3,612,522

[72] Inventor Martin A. Ekonen
     29581 Puritan Ave., Livonia, Mich. 48154
[21] Appl. No. 48,169
[22] Filed June 22, 1970
[45] Patented Oct. 12, 1971

[54] POWER OPERATED SKIPPING ROPE APPARATUS
     8 Claims, 5 Drawing Figs.
[52] U.S. Cl. .................................................. 272/75
[51] Int. Cl. .................................................. A63b 5/20
[50] Field of Search .......................................... 212/74, 75

[56]         References Cited
       UNITED STATES PATENTS
3,013,798  12/1961  Willoughby .................. 272/74

Primary Examiner—Richard C. Pinkham
Assistant Examiner—Richard Dror
Attorney—Benjamin W. Colman ABSTRACT: The invention provides a power operated skipping rope secured at one end to a flexible, elastic, metallic arm of music wire attached to a tightly wound coil spring mounted upon a pin member. An elbow fitting provides a slip coupling secured to a motor-driven output shaft and to the pin member allowing slip to occur at the shaft or at the pin member. The other end of the skipping rope is secured to a swivel-type fitting mounted upon a supporting member.

PATENTED OCT 12 1971
3,612,522
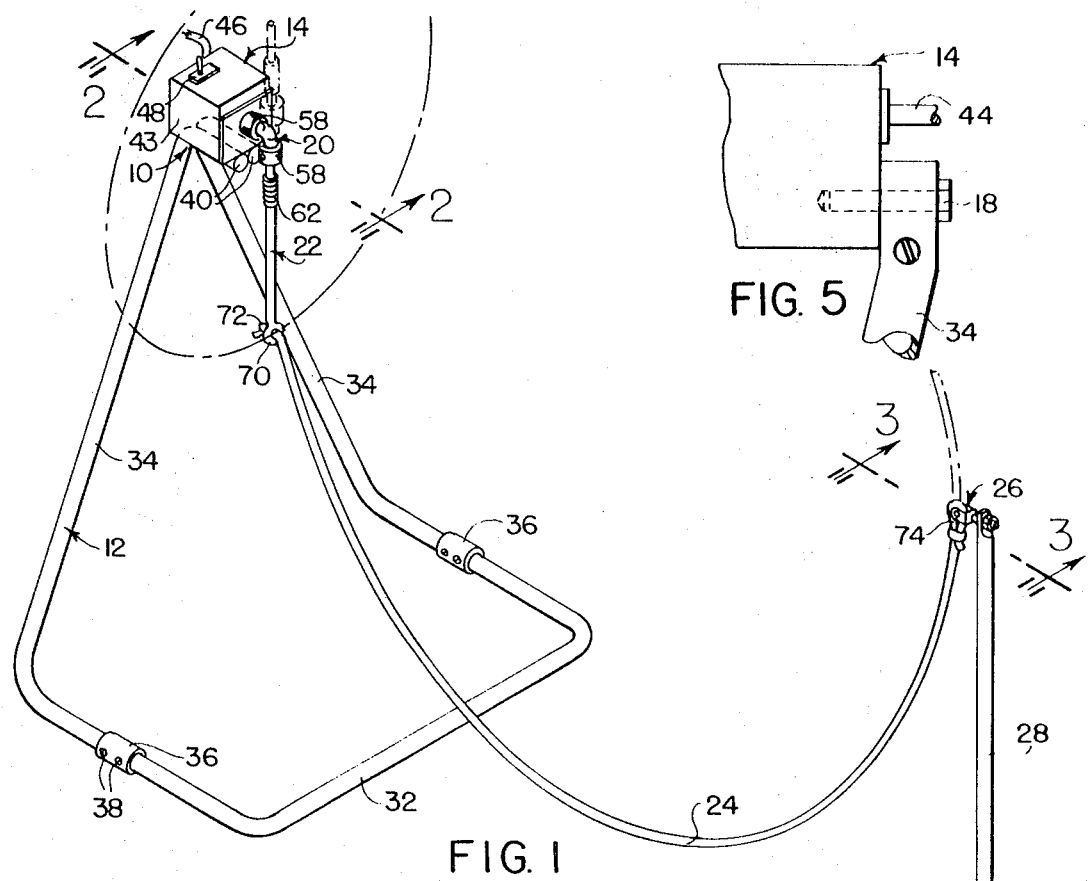
INVENTOR
MARTIN A. EKONEN
BY Benjamin W. Colman
ATTORNEY

POWER OPERATED SKIPPING ROPE APPARATUS

The invention relates to a power operated skipping rope apparatus having a portable knockdown type, segmented tubular stand supporting at its upper end an electrical motor-driven speed reducer device provided with an outboard shaft to which one end of an angular elbow-type slip coupling fitting is attached. From the other end of the fitting depends and projects a metallic flexible elastic arm to the distal end of which is secured the skipping rope. The other end of the rope is connected to a swivel joint fitting supported either on a rod or on other suitable support means such as the side of a building or any other suitable device or structure, or alternatively can be held in the hand of a child or person engaged in the skipping rope play.

The elbow-type slip coupling is provided with a taper threaded locknut on each slotted end of the fitting, the interior surfaces of which are coated with a material such that when a sufficient load or resistance is applied to or engaged by the flexible arm, it will not cause injury but will slip upon the drive shaft, and when the load is released or the resistance disengaged, the fitting will again firmly engage the shaft to rotate the flexible arm and the skipping rope attached to its distal end.

The coil spring and the flexible elastic link of the arm secured by the spring are preferably made of a music or spring wire composition, quite hard, resilient and elastic. This flexible arm and the elbow-type slip coupling provide an inventive advance over the prior art structures and disclosures of which applicant has knowledge. This prior art includes Delk, U. S. Pat. No. 3,411,775; Willoughby, U.S. Pat. No. 3,013,798 and Morrow, U.S. Pat. No. 3,263,995. None of these patent references discloses the particular means and construction of the instant application which make the disclosed apparatus especially effective and operative and, as applicant believes, relatively inexpensive for the general market to which the invention is directed.

It is a principal object of the invention to provide a power operated skipping rope apparatus in which a simple elbow-type fitting operates as a slip coupling with and upon an electrically powered motor-driven shaft. A further object is to provide in such device and with such coupling a metallic flexible elastic arm for rotating an attached skipping rope. Yet another object is to provide a knockdown type segmented portable stand upon the upper end of which is mounted the electrically operated motor drive.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a perspective view of an embodiment of the skipping rope apparatus of this invention.

FIG. 2 is a fragmentary elevational view taken substantially on the line 2—2 of FIG. 1, illustrating the slip coupling and flexible arm portions of the apparatus.

FIG. 3 is a fragmentary elevational view taken substantially on the line 3—3 of FIG. 1, illustrating the swivel joint fitting connection and support for one end of the skipping rope.

FIG. 4 is a fragmentary elevational view of a modified form of attachment and support for one end of the swivel joint fitting on the skipping rope.

FIG. 5 is a fragmentary elevational view of a modified form of attachment of the motor drive device to the supporting frame.

The skipping rope apparatus 10, as illustrated in the several views of the drawings, comprises a supporting frame 12, an electrically operated motor-driven drive device 14 mounted upon a support plate 16 secured to the stand by screw fasteners 18, an elbow-type slip coupling fitting 20 to which is secured and from which depends the flexible elastic arm 22, a swingable relatively limp skipping rope 24 having one end secured to the arm, a swivel joint fitting 26 to which the other end of the rope 24 is secured, and a support rod 28 for the swivel joint fitting adapted to be stuck in the ground so as to support the distal end of the skipping rope. Alternatively, the fitting 26 can be attached to a supporting structure or held in the hand by a person engaged in the skipping rope play.

The supporting frame 12, preferably made of tubular elements, comprising a U-shaped base member 32, a pair of vertical support members 34,34 secured by couplings 36,36 and screws 38,38 to the U-shaped member 32, provides a portable stand for the drive device 14. The upper ends 40,40 of the vertical members 34,34 are inturned to project horizontally above the base of the frame. These inturned ends 40,40 are secured together in parallel adjacent relationship by a screw fastener 42.

The motor-driven device 14, preferably comprising a unitary motor and gear-type speed reducer 43 having a fractional horsepower output rating of about 10 to 12 inch pounds of torque at the output end of the drive shaft 44, is mounted by any suitable means upon the support bracket 16 which is bolted to the inturned ends 40,40 of the vertical support members 34,34. Alternatively, the motor drive device 14 can be secured directly to upturned ends 40,40 of the frame members 34,34 which are canted forwardly above the base of the support frame for better balance, by fasteners 18, as illustrated in FIG. 5. The drive shaft 44 projects horizontally from the drive unit 14, which is powered by a source of electrical energy through a three-wire grounded cord 46 having a manually operable switch 48 connected therein.

The slip coupling 20, in the form of an elbow of about 90° as shown, is provided with a body 50 having each leg or end arranged with an externally tapered threaded portion 52, and an interior lining 54 of a plastic material, such for instance as Teflon, vinyl, polypropylene, or other suitable material or coating providing a slip joint between the coupling 20 and the output shaft 44 of the motor drive unit 14, as well as a slip connection with the proximal end of the flexible elastic arm 22 attached to the other leg of the elbow coupling. The ends 52,52 of the coupling are slotted as at 56, so that when the internally tapered locknut 58 is threadedly engaged with the tapered ends 52, these ends will lock and engage upon the motor driven shaft 44 and the proximal end of the flexible arm 22.

The flexible arm 22 comprises a first pin link member 60, a coil spring 62 having one end tightly wound and securely engaged with the distal end 64 of the member 60, and having its other end tightly secured upon the proximal end 66 of the extension lever or member 68 provided at its distal end with a loop 70 adapted to receive the end of the skipping rope 24 which is knotted as at 72 or can be tied to the loop 70, as preferred. The pin member 60, the coil spring 62 and the extension member 64 are each preferably made of a metallic spring or music wire composition which is relatively hard, flexible, resilient and elastic.

The skipping rope 24 is made of conventional woven hemp material or of a solid or tubular plastic vinyl material, or of other suitable material which is substantially flexible and soft, and would not be injurious to children or persons using the skip rope should the rope come into swinging engagement with their bodies or any portion thereof. The other end of the skipping rope 24 is attached by tying or a loop 74 to the swivel joint fitting bracket 76 rotatably secured upon the pin and ball member 78 affixed to the upper end 80 of the support rod 28, the lower end of which is stuck into the ground or can be held by a person engaged in the skipping rope play. Alternatively, the pin and ball member 78 can be secured to a fitting 82 attached to a building or other support surface 84 in any convenient way.

The skipping rope apparatus 10 is assembled and operated as follows. The U-shaped base member 32 and the vertical support members 34,34 are connected by the couplings 36 and screws 38 to form the support frame 12. The upper ends 40,40 of members 34 are secured together by the screw fastener 42. The support plate 16 for the motor driven device 14 is secured by fasteners 18 to the projecting parallel frame members 40,40 so that the output drive shaft 44 of the device 14 projects beyond and outboard of the support bracket 16. One leg 52 of the elbow-type slip coupling fitting 20 is then attached to the output drive shaft 44 by firmly engaging the end 52 upon the shaft by locknut 58. The proximal pin member 60 of the flexible arm 22 is then inserted into the depending slotted tapered end portion 52 of elbow fitting 20 and firmly engaged therewith by the second locknut 58. One end of the skipping rope 24 is passed through the distal loop end 70 of the flexible arm 22 and either tied to that end or a knot formed in the skipping rope so that it becomes positively engaged with the flexible arm. The other end 74 of the rope is tied to the bracket member 76 of the swivel joint fitting 26 and the support rod 28 is then stuck into the ground to support the distal swiveling end of the skipping rope 24. The support rod is preferably of a length such that when it is placed in the ground, or held to the ground plane by the hand of a person engaged in the skipping rope play, that the swivel joint fitting 26 is approximately at the same vertical height as the drive shaft 44 on the support frame 12. The axes of the drive shaft 44 and the swivel joint fitting 26 need not coincide nor be in alignment, though a great or substantial variation in height and/or alignment between these two pivoting points of the skipping rope may interfere with satisfactory play.

In addition to the simplicity of the apparatus disclosed herein, a significant advantage resides in the fact that the flexible elastic arm 22 and the slip coupling 20 twirl and swing the skipping rope in a style substantially the same as or similar to that achieved by manual operation. Sufficient force is applied to maintain a suitable large loop for a person skipping the rope. Yet, should the rope engage a player or a resistant object which interferes with its twirling, the coupling 20 will slip upon the drive shaft 44, and neither the flexible arm 22 nor the rope 24 will cause injury to the player or the resistant object. A nonflexible arm would tend to strike harder and cause some injury. When the interference is removed, the rope is again carried by the power driven arm 22 into its elliptical swinging motion.

Although certain particular embodiments of the invention are herein disclosed for purposes of explanation, further modifications thereof, after study of this specification, will become apparent to those skilled in the art to which the invention pertains. Reference should be had to the appended claims in determining the scope of the invention.

I claim:

1. In a power operated skipping rope apparatus, the improved combination comprising a frame supported motor drive device having a horizontally rotatable output drive shaft, an elbow-type slip coupling having one leg frictionally secured to and upon said shaft and its other leg extending at an included angle to said first leg of about 90°, a metallic flexible elastic arm secured to and depending from said coupling second leg comprising a substantially rigid link member having one end secured to said coupling, a tightly wound coil spring secured to and upon the other end of said link member, and a flexible elastic extension member of substantial length secured to and by the other end of said coil spring and extending therefrom substantially in alignment with said link member and said coil spring, said flexible elastic arm being made of a hard, resilient wire composition and terminating at its distal end in a loop, a flexible relatively limp skipping rope having one end thereof secured to the distal end of said flexible elastic arm at said loop, and a swivel joint fitting secured to a supporting member, the distal end of said skipping rope being secured to said swivel joint fitting.

2. The apparatus defined in claim 1, wherein said motor drive support frame comprises a tubular U-shaped base member, a pair of tubular vertical support members coupling-attached to said base member at their lower ends, and a mounting bracket secured to the upper inturned ends of said vertical support members disposed substantially in parallel with the plane of said base member, said motor drive being attached to said mounting bracket with said drive shaft extending horizontally outwardly therefrom.

3. The apparatus defined in claim 1, wherein said link member, coil spring and extension member normally extend from said coupling at an angle to said drive shaft at about 90° to the axis of said drive shaft.

4. The apparatus defined in claim 1, wherein said slip coupling will slip upon said drive shaft when said skipping rope meets and engages an unyielding resistance.

5. The apparatus defined in claim 1, wherein said slip coupling comprises a body having end portions or legs provided on their outer surfaces with a tapered thread, an interior coating in said legs adapted to permit said coupling to engage and to slip upon said drive shaft and said link member, said end portions being slotted longitudinally to allow for compression of said portions upon the engaged drive shaft and link member, and a locknut for and threadedly engageable upon each of said end portions to secure said drive shaft and said link member.

6. The apparatus defined in claim 1, wherein said motor drive support frame comprises a tubular U-shaped base member, a pair of tubular vertical support members coupling-attached to said base member at their lower ends, the upper ends of said tubular vertical support members being secured to said motor drive device above said base member, said tubular support member upper ends being secured together and directly to said motor drive device, said motor drive device being positioned in balanced relationship above and within the perimeter of said base member.

7. The apparatus defined in claim 1, wherein said motor drive support frame comprises a tubular U-shaped base member and a pair of tubular vertical support members integrally formed therewith and extending upwardly therefrom, the upper ends of said tubular vertical support members being secured to said motor drive device, said drive shaft extending horizontally outwardly of said support frame, said motor drive device being positioned in balanced relationship above and within the perimeter of said base member.

8. The apparatus defined in claim 5, wherein said slip coupling interior coating comprises a Teflon-type material.